United States Patent

Fodor

[11] 4,280,481
[45] Jul. 28, 1981

[54] FORCED-AIR HEAT EXCHANGE SYSTEM

[76] Inventor: Joseph E. Fodor, 712 Shore Dr., Boynton Beach, Fla. 33435

[21] Appl. No.: 135,493

[22] Filed: Mar. 31, 1980

[51] Int. Cl.³ ............................................. F24J 3/02
[52] U.S. Cl. ................................ 126/429; 126/435; 126/285 R; 236/49; 237/46
[58] Field of Search ............... 126/422, 417, 428–431, 126/432, 437, 419, 285 R, 435; 236/49, 93 R; 237/46

[56] References Cited

U.S. PATENT DOCUMENTS

| 2,553,073 | 5/1951 | Barnett | 126/435 |
| 3,997,108 | 12/1976 | Mason | 126/430 |
| 4,051,999 | 10/1977 | Granger et al. | 126/431 |
| 4,196,719 | 4/1980 | Skrivseth | 126/430 |
| 4,228,786 | 10/1980 | Frankenfield | 126/427 |

Primary Examiner—James C. Yeung
Attorney, Agent, or Firm—Oltman and Flynn

[57] ABSTRACT

The present forced-air heat exchange system has a solar collector through which air is circulated by a blower to the air inlet of a heat exchanger. The heat exchanger has an air outlet connected to a recirculation duct leading to the air inlet of the blower. A recirculation damper in this duct is open when the temperature of the recirculated air in the system is higher than that of the ambient air outside the system, and it closes when the ambient air temperature is higher. Pressure sensitive draft regulators at the inlet and outlet sides of the recirculation damper remain closed when the damper is open and they open automatically when the damper closes, thereby admitting ambient air into the recirculation duct at the outlet side of the damper and venting the recirculation duct at the inlet side of the damper.

5 Claims, 3 Drawing Figures

FORCED-AIR HEAT EXCHANGE SYSTEM

SUMMARY OF THE INVENTION

This invention relates generally to a forced-air heat exchange system in which fan-driven air conveys heat from a heater to a heat exchanger, and particularly to such a system having a solar collector as the heater.

A principal object of this invention is to provide a novel heat exchange system which responds to a temperature differential between ambient air outside the system and air which is being recirculated inside the system.

In the presently-preferred embodiment the system has a temperature differential-operated recirculation damper which closes automatically to block the recirculation of air between the air outlet of the heat exchanger and the air inlet of the heater when the recirculated air temperature inside the system drops below the ambient air temperature outside. A first normally-closed draft regulator at the air inlet side of the recirculation damper opens automatically to vent the system there when the recirculation damper closes. A second normally-closed draft regulator at the air outlet side of the recirculation damper opens automatically to admit ambient air into the system there when the recirculation damper closes. Both draft regulators preferably are pressure sensitive, the first opening automatically as a result of an increase in the air pressure in the system at the air inlet side of the recirculation damper when the latter closes, and the second opening automatically as a result of a decrease in the air pressure in the system at the air outlet side of the recirculation damper when the latter closes.

Further objects and advantages of this invention will be apparent from the following detailed description of a presently-preferred embodiment thereof, shown in the accompanying drawing.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

DETAILED DESCRIPTION

Figure 2:
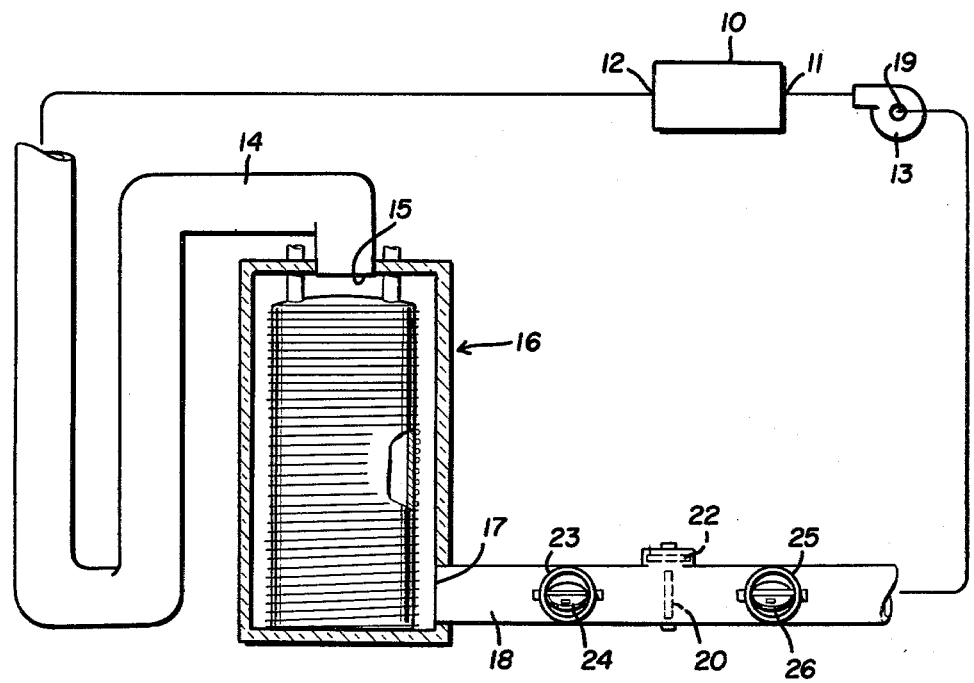
FIG. 2 shows the present system schematically.

Referring first to FIG. 2, the present system comprises an air heater 10 having an air inlet 11 and an air outlet 12. The air inlet of heater 10 receives air from a blower 13. The air outlet 12 of heater 10 is connected through an air duct 14 to the air inlet 15 of a heat exchanger 16 of known design, which withdraws heat energy from the air coming in at the inlet 15. The heat exchanger has an air outlet 17 which is connected to a recirculation duct 18 leading to the air inlet 19 of blower 13.

Figure 1:
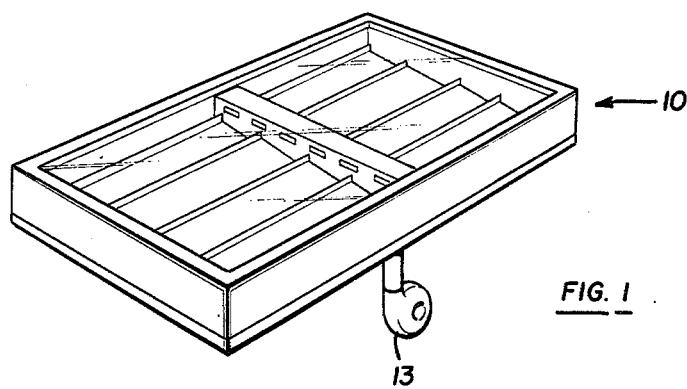
FIG. 1 is a perspective view of a solar collector and a blower connected to an air inlet of the collector, as part of a preferred embodiment of the present heat exchange system.

The heater 10 (FIG. 1) preferably is constructed as described in detail in my U.S. Patent application Ser. No. 920,465 filed June 29, 1978, U.S. Pat. No. 4,203,428, to which reference may be had for a detailed description of its operation. However, it is to be understood that a different type of solar collector for heating air may be used in its place, or the air heater 10 may be other than a solar heater, if desired.

Figure 3:
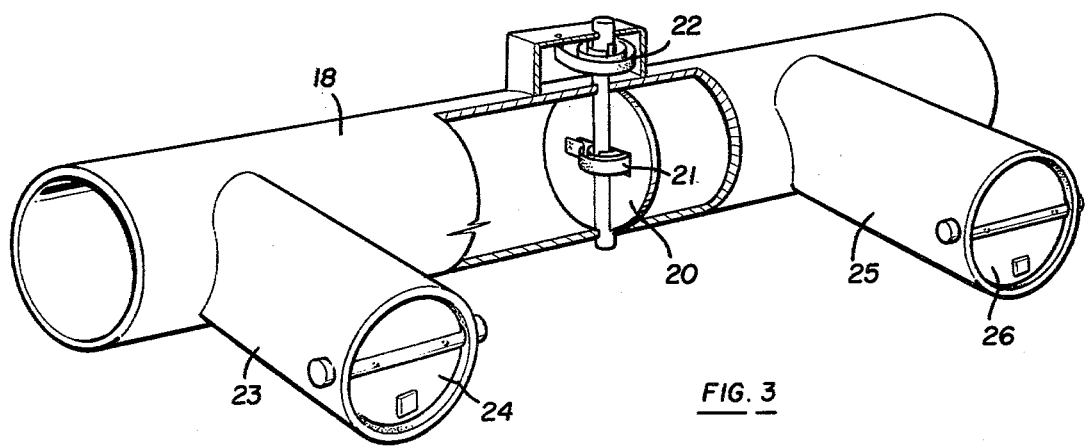
FIG. 3 is a fragmentary perspective view, with parts broken away for clarity, showing the temperature differential-operated recirculation damper and the two pressure-sensitive draft regulators in the FIG. 2 system.

Referring to FIG. 3, contained within the air recirculation duct is a recirculation damper 20 which is rotatable between the position in FIG. 3, in which it completely blocks the flow of air and a position a quarter-turn from the one shown, in which it permits substantially unobstructed flow of air in the duct. Associated with the damper is a first bimetal strip 21, which senses the air temperature inside the duct 18, and a second bimetal strip 22, which senses the ambient air temperature outside the duct. The two temperature-sensitive bimetal strips 21 and 22 are operatively coupled to the damper 20 in any suitable fashion to maintain it in the fully open position (permitting substantially unobstructed air flow through duct 18) as long as the air temperature inside the duct exceeds the ambient air temperature outside the duct. When the outside air temperature exceeds the air temperature inside the duct, however, the conjoint action of the two bimetal strips 21 and 22 is to rotate the damper 20 to the fully closed position shown in FIG. 3, thus blocking the flow of recirculated air from the heat exchanger's air outlet 17 to the air inlet 19 of blower 13.

At the air inlet side of the recirculation damper 20 a first short branch duct 23 (FIG. 3) is connected to the recirculation duct 18, preferably extending horizontally perpendicular to it, as shown in FIGS. 2 and 3. A normally-closed first draft regulator in the form of a horizontally pivoted damper 24 is mounted in the outer end of this branch duct. This draft regulator is pressure sensitive so that a slight increase in the air pressure inside branch duct 23 will cause it to move from its normally-closed position to an open position in which it vents to the atmosphere the interior of branch duct 23 and the interior of the air recirculation duct 18 at the air inlet side of the recirculation damper 20. The first draft regulator 24 is biased closed by gravity or a light spring, or both, the force of which adds to the force of the ambient air pressure on the outside to overcome the force of the air pressure inside the branch duct 23 as long as the recirculation damper 20 remains open. However, when damper 20 closes, the resulting increase of the air pressure in branch duct 23 causes an increase in the opening force which it exerts on the draft regulator 24, exceeding the closing force exerted on it by the ambient air pressure and the bias spring and/or gravity. Consequently, the draft regulator 24 will open to vent the first branch duct 23 to the atmosphere when the recirculation damper 20 closes.

At the air outlet side of the recirculation damper 20 a second short branch duct 25 is connected to the recirculation duct 18, preferably extending horizontally perpendicular to it and parallel to the first branch duct 23. A normally-closed second draft regulator in the form of a horizontally pivoted damper 26 is mounted in the outer end of branch duct 25. This second draft regulator is pressure sensitive so that a slight decrease in the air pressure inside branch duct 25 will cause it to move from its normally closed position to an open position in which it admits ambient air from the outside into branch duct 25 and from there into the recirculation duct 18 at the air outlet side of the recirculation damper 20. The second draft regulator 26 is biased closed by gravity or a light spring, or both, the force of which adds to the force of the air pressure inside the branch duct 25 to overcome the force of the ambient air pressure outside as long as the recirculation damper 20 remains open. However, when damper 20 closes, the resultant reduction of air pressure in the branch duct 25 causes a reduction in the closing force of the draft regulator 26 below the opening force exerted by ambient air pressure, and consequently draft regulator 26 will open automatically to admit ambient air into duct 18 at the air outlet side of the now-closed recirculation damper 20.

With the foregoing arrangement in the present system, the air supplied to the blower 13 and from there to the heater 10 either comes from the air outlet 17 of the heat exchanger 16 or is ambient air, whichever is at the higher temperature. By thus supplying to the heater 10 the hottest input air available, the temperature of the air coming out of the heater is maximized and therefore the overall efficiency of the system is maximized also. The ambient air intake duct 25 may be located in an attic or other location where the air temperature normally is higher than elsewhere in the premises being heated. Each of the pressure sensitive draft regulators 24 and 26 requires no auxiliary power source, such as an electric motor, to open and close it and this contributes to the overall efficiency of the present system from the standpoint of its energy input requirements.

I claim:

1. In a forced air heat exchange system having:
a heater having an air inlet and an air outlet;
blower means operatively connected to circulate air through said heater between said air inlet and said air outlet;
heat exchanger having an air inlet operatively connected to said air outlet of the heater to receive heated air therefrom, said heat exchanger having an air outlet;
and air recirculation duct means operatively connected between the air outlet of said heat exchanger and the air inlet of said heater;
the improvement which comprises:
a recirculation damper operatively connected in said duct means to control the air flow therethrough;
temperature differential sensing means operatively connected to said recirculation damper to control its position in accordance with the temperature difference between air inside said duct means and ambient air outside said duct means;
a normally-closed first draft regulator operatively arranged between the exterior and the interior of said duct means at the air inlet side of said recirculation damper and operable to open automatically when said recirculation damper closes, whereby to vent the interior of said air recirculation duct means at the air inlet side of said recirculation damper to the outside of said air recirculation duct means;
and a normally-closed second draft regulator operatively arranged between the exterior and the interior of said air recirculation duct means at the air outlet side of said recirculation damper and operable to open automatically when said recirculation damper closes, whereby to admit ambient air from the outside of said air recirculation duct means into said air recirculation duct means at the air outlet side of said recirculation damper.

2. A system according to claim 1, wherein said first draft regulator is pressure sensitive and opens in response to an air pressure increase in said duct means at the air inlet side of said recirculation damper in response to the latter's closing.

3. A system according to claim 2, wherein said second draft regulator is pressure sensitive and opens in response to an air pressure decrease in said duct means at the air outlet side of said recirculation damper in response to the latter's closing.

4. A system according to claim 3, wherein said heater is a solar collector, and further comprising a blower in said duct means between the air outlet side of said recirculation damper and in the air inlet of said heater for drawing air through said duct means and forcing it through said heater.

5. A system according to claim 1, wherein said second draft regulator is pressure sensitive and opens in response to an air pressure decrease in said duct means at the air outlet side of said recirculation damper in response to the latter's closing.

* * * * *